(12) United States Patent
Bernabeu-Auban et al.

(10) Patent No.: US 7,996,719 B2
(45) Date of Patent: Aug. 9, 2011

(54) EXPRESSING FAULT CORRELATION CONSTRAINTS

(75) Inventors: Jose Bernabeu-Auban, Sammamish, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 12/258,158

(22) Filed: Oct. 24, 2008

(65) Prior Publication Data

US 2010/0107015 A1 Apr. 29, 2010

(51) Int. Cl.
*G06F 11/00* (2006.01)
(52) U.S. Cl. ............................................. 714/26; 714/37
(58) Field of Classification Search .................... 714/26, 714/37
See application file for complete search history.

(56) References Cited

U.S. PATENT DOCUMENTS

| | | | |
|---|---|---|---|
| 6,006,016 A | 12/1999 | Faigon | |
| 6,067,548 A * | 5/2000 | Cheng | 1/1 |
| 6,151,689 A | 11/2000 | Garcia | |
| 6,880,002 B2 | 4/2005 | Hirschfeld | |
| 7,103,874 B2 * | 9/2006 | McCollum et al. | 717/121 |
| 7,231,550 B1 * | 6/2007 | McGuire et al. | 714/26 |
| 7,577,683 B2 * | 8/2009 | Cho et al. | 1/1 |
| 7,756,901 B2 * | 7/2010 | Thier | 707/802 |
| 2006/0036570 A1 * | 2/2006 | Schaefer et al. | 707/1 |
| 2006/0129998 A1 * | 6/2006 | Florissi et al. | 717/127 |
| 2008/0083031 A1 | 4/2008 | Meijer | |
| 2008/0126406 A1 | 5/2008 | Endabetla | |
| 2010/0192013 A1 * | 7/2010 | Krishnan et al. | 714/26 |

OTHER PUBLICATIONS

Enomalism. Jul. 3, 2008. http://enomalism.com/.
IBM Unveils 'Cloud Computing' Initiative. Jul. 3, 2008. http://www.networkworld.com/news/2007/111507-ibm-cloud-computing.html .
Cloud Computing. Oct. 8, 2007. http://downloadboulder.ibm.com/ibmdl/pub/software/dw/wes/hipods/Cloud_computing_wp_final_8Oct.pdf.
Enterprise Cloud. Jul. 3, 2008. http://www.theenterprisecloud.com.
Sun's Cloud Computing for SaaS? Jul. 3, 2008. https://hpc.sun.com/feed/httpplanetssuncomhpcgroupblogsfeedatom/sun039s-cloud-computing-saas.
Amazon Elastic Compute Cloud (Amazon EC2)—Beta. Jul. 3, 2008. http://www.amazon.com/gp/browse.html?node=201590011.
Intellevate Prior Art Search Report, Jul. 3, 2008.

* cited by examiner

*Primary Examiner* — Marc Duncan
(74) *Attorney, Agent, or Firm* — Shook Hardy & Bacon LLP

(57) ABSTRACT

Methods, systems, and computer-readable media for expressing fault correlation constrains to a developer of a service application are provided. Initially, the fault correlation constraints are identified by inspecting an architecture of resources comprising a data center. Based on the resources, sets of nodes that become concurrently unavailable due to a failure mode or update scheme are aggregated. These fault correlation constraints, upon being communicated to the developer, then may be incorporated into a service model produced thereby. Accordingly, the service model is tailored to the specific characteristics of the data center and is provided with instructions as to how to partition instances of the service application throughout the distributed resources of the data center. Thus, the fault correlation constraints provide a developer with insight into rules and structures on which the data center is constructed and assurances of a certain level of fault tolerance upon deploying the service application.

20 Claims, 6 Drawing Sheets

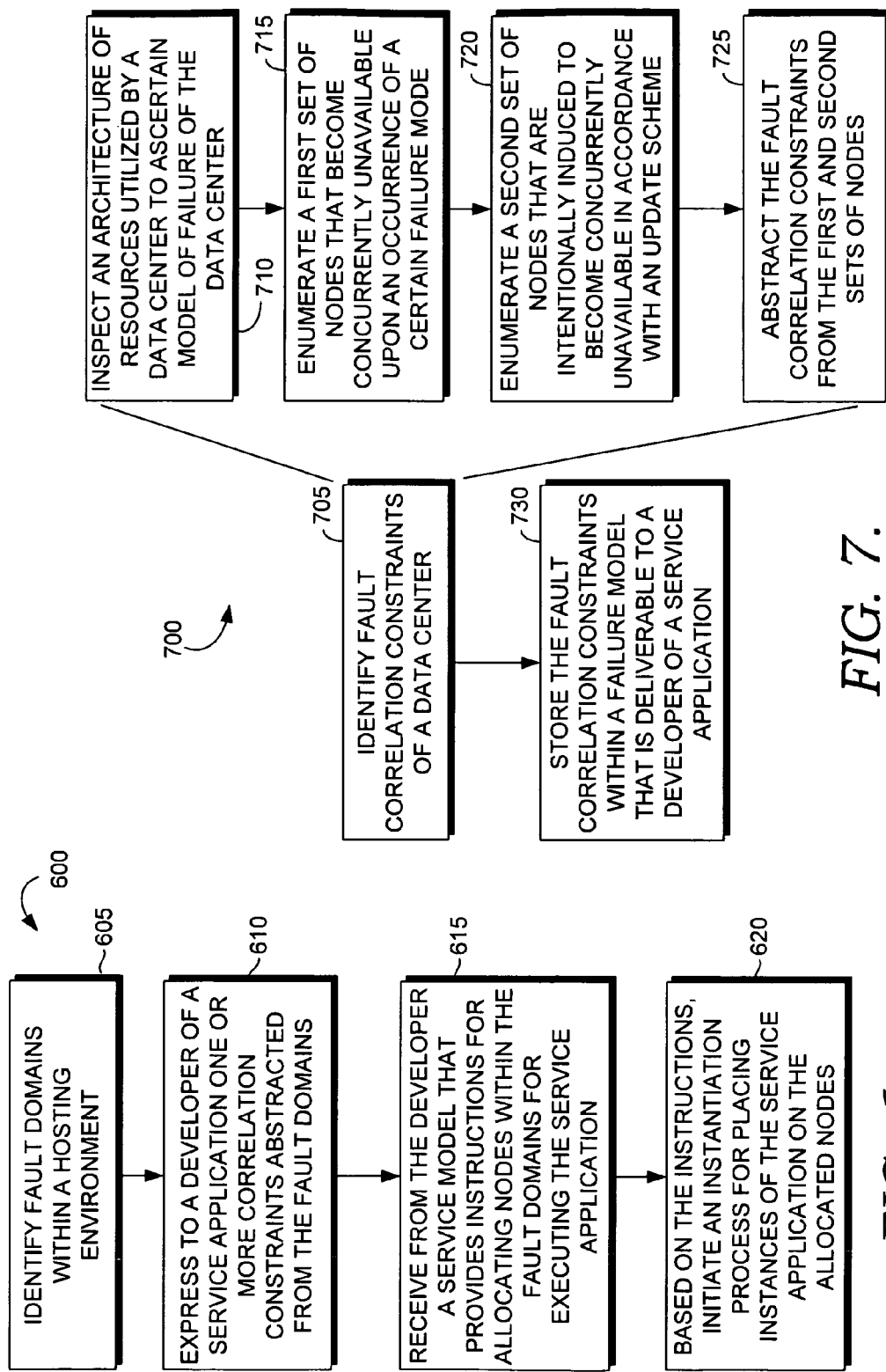

EXPRESSING FAULT CORRELATION CONSTRAINTS

BACKGROUND

Typically, developers write software applications to allow for many degrees of freedom in their configuration. By way of example, these developers are able to leverage these degrees of freedoms by establishing a software application that operates within specific constrains of a particular platform that is provided to support the software application. Thus, these freedoms associated with the software application enable the software application to operate in cooperation with the platform.

In one instance, this configuration of software application may be employed by application-service providers (ASPs) who develop the software application to operate on a platform that is remotely accessible via the Internet. In this instance, the platform executes the software program in such a way that users may remotely manipulate files using the software application. Accordingly, the platform is adapted to establish underlying elements of the software application running thereon to accommodate a current load of the remote usage. The degrees of freedom in the software application allow for scaling up or down these underlying elements and for managing the coordination therebetween. However, because the platform includes hardware components, it is susceptible to the introduction of failures and the implementation of updates. These situations may cause one or more of the underlying elements to fall offline and, consequently, may disrupt the operation of the software application. In one instance of a disruption, the software application may not fulfill the load applied by the remote users, while in another instance, the entire software application may crash.

Current solutions to prevent the disruption of the software application rely on curators of the platform manually installing the underlying elements according to the load, failures, and updates. These ad hoc solutions are labor-intensive and error-prone. Further, these current solutions are nonpreventative and require a failure to occur prior to taking action. These shortcomings of manual involvement are exaggerated when a the platform is expansive in size, comprising a multitude of interconnected hardware components, that support the operation of a multitude of software applications.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer storage media for expressing fault correlation constraints to a developer of a service application. Initially, the fault correlation constraints are identified by inspecting an architecture of resources (e.g., underlying hardware) comprising a data center. Based on the architecture of resources, sets of nodes that become concurrently unavailable due to a failure mode or update scheme are recorded as a fault domain and an update domain, respectively. These fault correlation constraints, upon being communicated to the developer, may be incorporated into a service model designed thereby. Accordingly, the service model is tailored to the specific characteristics of the data center and is provided with instructions as to how to partition instances of the service application throughout the distributed resources of the data center. Thus, the fault correlation constraints provide a developer with insight into rules and structures on which the data center is constructed and allow the service application to attain a certain level of fault tolerance upon deployment thereto.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein:

FIG. 6 is a flow diagram showing an overall method for placing instances of a service application according to a service model, in accordance with an embodiment of the present invention; and FIG. 7 is a flow diagram showing an overall method for developing a failure model of a data center for delivery to a developer of a service application, in accordance with an embodiment of the present invention.

DETAILED DESCRIPTION

Figure 1:
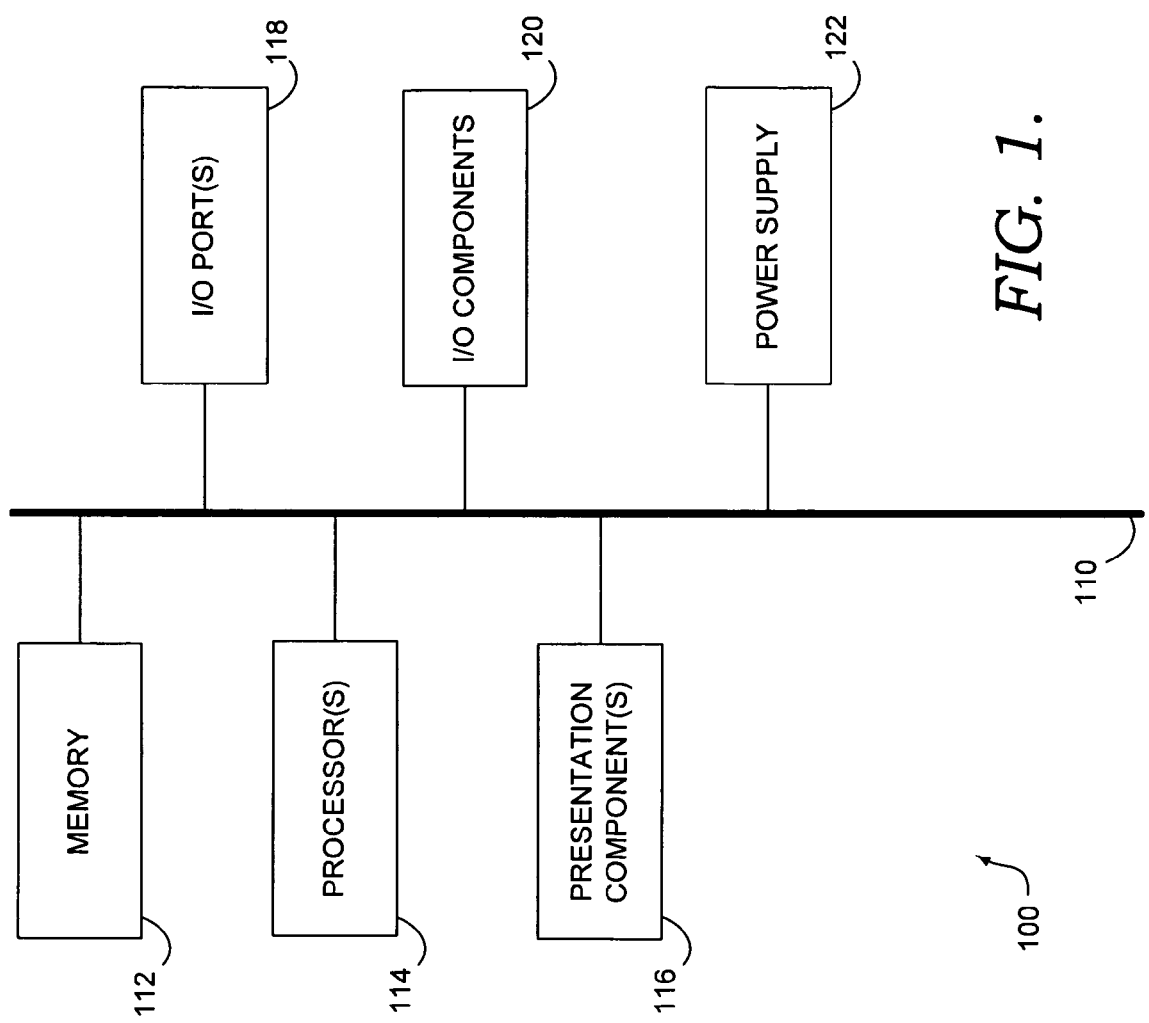
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer-storage media having computer-executable instructions embodied thereon that, when executed, perform methods in accordance with embodiments hereof, for abstracting details of a configuration of the underlying hardware of a data center, and conveying the abstracts to a developer of a service application. The conveyance of the abstracts may take the form of fault correlation constraints. Generally, fault correlation constraints take the form of a uniform set of concepts the developer can use to design protocols of the service application. In addition, the fault correlation constraints are understandable by a fabric controller that deploys the service application onto the data center. Accordingly, the deployed service application can attain a certain level of fault tolerance as the deployment considers the configuration of the underlying hardware of a data center.

Accordingly, in one aspect, embodiments of the present invention relate to one or more computer-readable media that has computer-executable instructions embodied thereon that, when executed, performs a method for facilitating persistent availability of a service application by expressing one or more fault correlation constraints to a developer of the service application. In embodiments, the method includes, in no particular order, identifying fault domains within a hosting environment. As discussed more fully below, the fault domains each represent a set of nodes that each concurrently become unavailable upon an occurrence of a particular failure mode within the hosting environment. Fault correlation constraints, which are an abstraction of the identified fault domains, may be expressed to the developer of the service application. In response, a service model is received from the developer that provides instructions for allocating one of the set of nodes within one or more of the fault domains within the hosting environment. Each node is designed to execute at least one role of the service application. In operation, the role comprises a component program that supports the functionality of the service application. Based on the instruction of the service model, instantiation process is initiated consistent with the service model that places the instances of the role on the allocated nodes within the set of nodes of the fault domain.

In an exemplary embodiment, the method further includes identifying a class of failures as one of the fault domains. Accordingly, the fault domains each represent the class of failures to hardware or software components that, upon occurrence, induce a respective set of nodes supported by the failed hardware or software to cease functioning properly. Particularly, identifying a class of failures for designation as a fault domain may include constructing a hierarchy of classes of failures based on characteristics of the hosting environment, where the hierarchy is organized based on a frequency of occurrence of each of the classes of failures, and utilizing the hierarchy for identifying one or more of the classes of failures as fault domains. By way of example, a class of failures that is predicted to fail software or hardware very frequently, compared to other classes of failures, may be ranked high in the hierarchy. Thus, the highly ranked class of failures will likely be identified as a fault domain in order to inform a developer to build in safety to the service model.

In another aspect, embodiments of the present invention relate to a computerized method for developing a failure model of a data center for delivery to a developer of a service application. In embodiments, the method initially includes, but is not limited to, identifying fault correlation constraints of a data center. Identifying fault correlation constraints may be carried out by one or more of the following steps: inspecting an architecture of resources utilized by a data center to ascertain modes of failure of the data center, enumerating at least a first set of nodes within the data center that concurrently become unavailable upon an occurrence of the ascertained failure mode, enumerating at least a second set of nodes within the data center that are intentionally induced to become concurrently unavailable in accordance within an update scheme, and abstracting the fault correlation constraints from at least one the first set of nodes and the second set of nodes. The method for developing a failure model of a data center may continue by, at least temporarily, storing the fault correlation constraints within a failure model that is deliverable to the developer of the service application. Generally, the service application is executable upon being distributed throughout the architecture of resources of the data center.

In an exemplary embodiment of the computerized method, the failure model that is conveyed to the developer of the service application expresses the enumerated first set of nodes as a fault domain and expresses the enumerated second set of nodes as an update domain. Further, semantics may be constructed. As used herein, semantics generally define a maximum aggregate number of fault domains and update domains that are allowed to be concurrently nonfunctional when executing the distributed service application. Also, the semantics often influence the manner of distribution of the service application throughout the data center. These semantics may be, at least temporarily, stored within the failure model, thereby conveying assurances to the developer that the design aspects of the data center will only allow a particular number of resources to fall offline at once.

In yet another aspect, embodiments of the present invention relate to a computer system for performing a method that abstracts fault domains from resources of a hosting environment. Generally, the computer system includes a processing unit coupled to a computer storage medium, where the computer storage medium stores a plurality of computer software components executable by the processing unit. Initially, the computer software components include an abstraction component and a communication component. The abstraction component is configured to abstract the fault domains of the hosting environment by identifying and grouping together sets of nodes that concurrently become unavailable upon an occurrence of a mode of failure of the resources comprising the hosting environment.

In one embodiment, the communication component is configured to communicate the abstracted fault domains and semantics as fault correlation constraints. The fault correlation constraints, when incorporated into a service model by a developer of a services application, influence distribution of the service application throughout the resources of the hosting environment. As discussed above, in examples, the semantics define a maximum aggregate number of fault domains and update domains that are allowed to be concurrently nonfunctional when executing the distributed service application. In other examples, where there are many classes of fault domains (e.g., based on a variety of failure modes) a particular number of fault domains per class is specified. Update domains are but an exemplary class of fault domain.

The communication component may be further configured to receive the service model that is based, in part, on the fault correlation constraints. The service model may additionally provide instructions for allocating nodes, within the sets of nodes encompassed by the fault domains, for accommodating instances of a role of the service application. Typically, the role is a component program that supports the functionality of the service application. Further, each of the instances accommodated by the nodes is essentially a single replication of the role. As such, the set of nodes comprising the fault domains provides a platform within the hosting environment for executing the instances of the role.

In an exemplary embodiment, the computer software components of the computer system also include a propagation component. The propagation component is charged with satisfying the instructions of the service model. In one instance, satisfying the instructions is carried out by installing the instances on the allocated nodes and administering configuration settings to the installed instances. As more fully discussed below, the configuration settings include a mapping that alerts each of the installed instances to a location of other installed instances within the hosting environment, thus, promoting communication therebetween.

Embodiments of the present invention relate to identifying fault domains and update domains within a hosting environment, or data center, and expressing these domains as fault correlation constraints within a failure model. As utilized herein, the phrase "failure model" is not meant to be limiting and generally refers to any communication that includes information pertaining to an architecture of resources. In embodiments, the failure model is independent of any particular data center. However, in a data center (or hosting environment as I believe you are refering to it), we need to identify the physical elements which map to the failure elements of the model.

Developers on our platform always see the same model, perhaps with different parameters (i.e., different classes of fault domains).

By way of example, the failure model articulates aspects of a hosting environment's framework (e.g., physical resources of the data center) and delineates an abstraction of the rules that govern the design and operation of the hosting environment. In another instance, the failure model provides a developer with details of the particular hardware arrangement within the data center.

In one instance, the failure model includes fault correlation constraints. These "fault correlation constraints" encompass a description of sets of nodes within the resources of the data center. In embodiments, the description of the sets of nodes includes characteristics of the nodes, such as whether the nodes become simultaneously unavailable upon an occurrence of a failure mode (e.g., power loss to a server), an update scheme (e.g., intentionally inducing nodes to fall offline in order to install software thereto), or any other circumstance that would affect availability of a grouping of nodes (e.g., strategic power-downs of equipment according to an energy-saving program).

In another instance, the fault correlation constraints encompass a description of semantics. As mentioned supra, "semantics" broadly refer to rules that the hosting environment is obliged to follow, which provide certain guarantees to the developer of the service application. By way of example, the semantics may define a maximum aggregate number of fault domains and update domains that are allowed to be concurrently nonfunctional when executing the service application. This allows the developer to be assured that there is a limit to the number of instances of the application that will simultaneously fail. Wielding this knowledge, the developer can instruct the hosting environment via a service model to install more instances of the service application than the maximum aggregate number of failed resources of the data center, as indicated by the semantics. Further, the semantics may regulate the distribution of the service application throughout the data center such that instances of the service application are installed on differing failure and update domains. Consequently, the assurances expressed to the developer are put into practice by distributing the service application across individually failing resources.

In response to the fault correlation constraints communicated by the failure model, a developer of a service application may generate a service model. As utilized herein, the phrase "service model" is not meant to be limiting and generally refers to any communication that includes information pertaining to establishing and managing instances of a service model within the hosting environment. In one instance, the service model includes a description of which roles of the service application are to be established, and how the instances of each of the roles are to be installed and activated within the data center. That is, the service model serves as an articulation of which roles should be running for the service application and conditions for where instances of the roles should be installed. By way of example, the service model may indicate that the service application includes roles A, B, and C, that are operably coupled through a certain connection path (e.g., a particular channel within the hosting environment) and indicate restrictions on use of particular resources for supporting the operation of the roles A, B, and C. In particular, the restrictions on use of particular resources indicated by the service model may include a restriction that instances of role A may not exist on a common fault domain, while instances of role B may not exist on a common fault domain with instances of role A.

Generally, "roles" provide a template description of a functional portion of the service application. Roles are described by indicating the computer code implementing the role, the conditions within the hosting environment that are required by the role, configuration settings to be applied to the role, and the role's set of endpoints for communication with other roles, elements, etc. In one instance, the role's configuration settings may include collective settings which are shared by all instances of the role, or individual settings that are particular to each instance of the role. In an exemplary embodiment, the roles each represent a particular class of component of the service application. Typically, the service model delineates how many instances of each of the one or more roles to place within the data center, where each of the instances is a replication of the particular class of component, or role. In other words, each role represents a collection of instances of each class of components, where the service application may have any number of classes of component for carrying out functions thereof.

The service model, upon being inspected by the fabric controller, provides abstract information for partitioning each of the instances of the particular class of component to nodes, or other tangible resources, located in separate fault domains and update domains. The fabric controller transforms this abstract information into concrete instructions based, in part, on the mapping of the physical elements of the data center to the fault model. By way of example, upon deployment of the service application within the data center, the data center must place the roles in the data center a particular number of times, in accordance with the service model. Accordingly, if the developer requests, via the service model, that each role is to be placed on at least five fault domains, the service application will be distributed on the data center such that at least five replicas, or instances, of each of the roles is placed on five differing nodes that are partitioned from common failure modes or update schemes. As such, the distribution of many instances provides fault resistance and an increased ability to cope with multiple failures of data center resources.

Although the developer is responsible for creating constraints that govern how many replicas of a role are to be established, a curator of the data center may design, deploy, and/or configure instances of the service applications within the confines of the constraints. For instance, the curator may build in additional instances of the service application when an update or failure is detected, thereby scaling up the occupation of the service application. Or, the curator may suspend a previously scheduled update to provide increased protection for a service application. Further, the curator may affect the number of instances based on other factors beyond resources falling offline, such as a workload on the service application inflicted by remote users. Accordingly, the location of the instances within the data center, and actual nodes that the instances are placed upon, are generally transparent to the developer.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
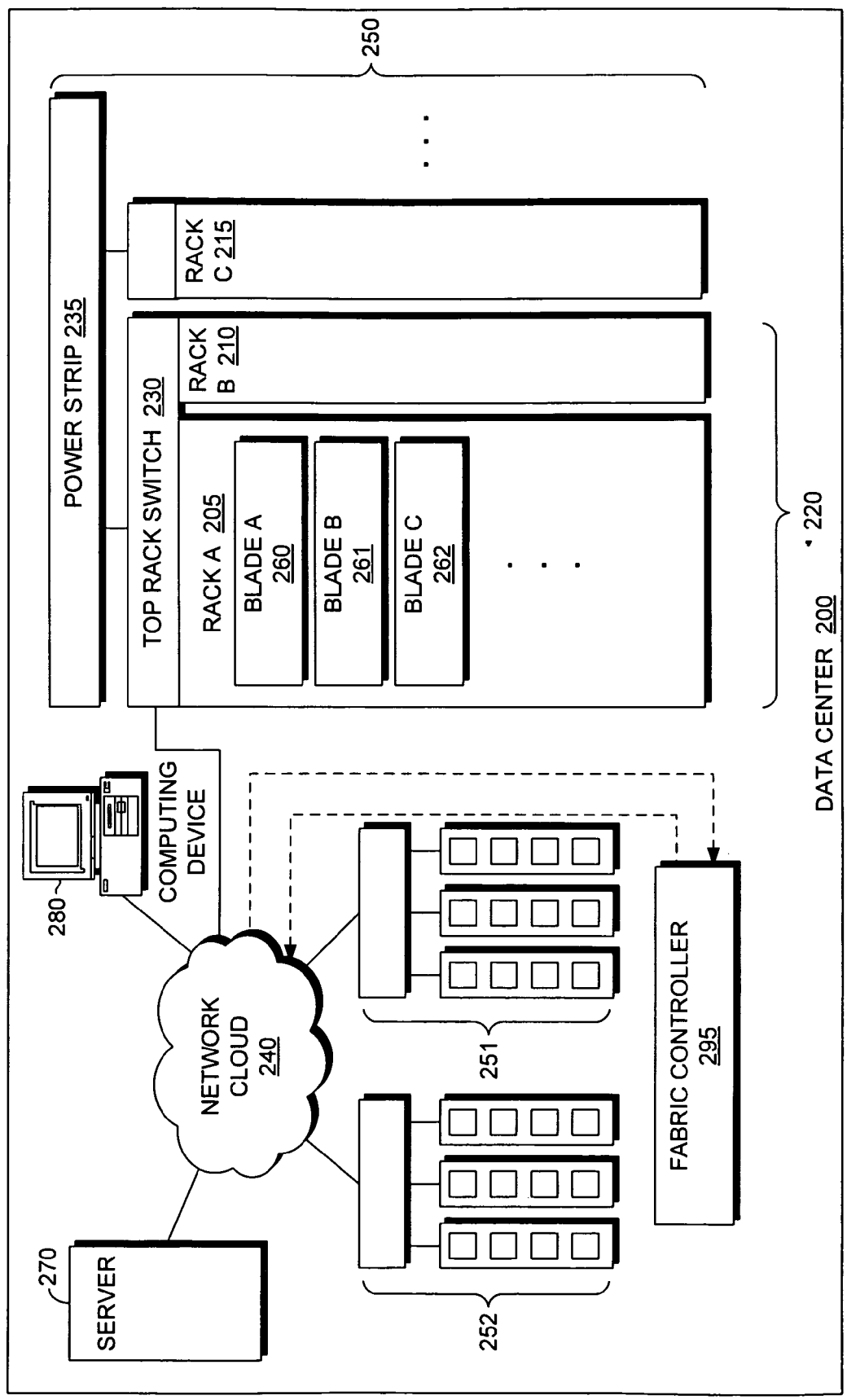
FIG. 2 is a block diagram illustrating a data center, suitable for use in implementing embodiments of the present invention, that is configured to accommodate and support operation of component programs of a service application according to a service model.

Turning now to FIG. 2, a block diagram is illustrated, in accordance with an embodiment of the present invention, showing a data center 200 configured to accommodate and support operation of component programs, or instances of roles, of a service application according to a service model. It will be understood and appreciated by those of ordinary skill in the art that the data center 200 shown in FIG. 2 is merely an example of one suitable portion of a hosting environment and is not intended to suggest any limitation as to the scope of use or functionality of embodiments of the present invention. Neither should the data center 200 be interpreted as having any dependency or requirement related to any single resource or combination of resources illustrated therein. Further, although the various blocks of FIG. 2 are shown with lines for the sake of clarity, in reality, delineating various components is not so clear, and metaphorically, the lines would more accurately be grey and fuzzy.

The data center 200 includes various resources interconnected via a network cloud 240. These resources, as described herein, may include software components (e.g., fabric controller 295) as well as tangible hardware elements, such as racks A 205, rack B 210, rack C 215, top rack switch 230, power strip 235, server 270, computing device 280, fault domain 251, and fault domain 252. The network cloud 240 interconnects these resources such that instances of service applications, which may be distributably placed across various physical resources, may recognize a location of other instances in order to establish communication therebetween. In addition, the network cloud 240 facilitates this communication over channels connecting the instances of the service application, and any other elements required by the service model. The network may include, without limitation, one or more local area networks (LANs) and/or wide area networks (WANs). Such networking environments are commonplace in offices, enterprise-wide computer networks, intranets, and the Internet. Accordingly, the network is not further described herein.

Generally, the data center 200 accommodates a distributed system with a plurality of component programs, or instances of the service application, running independently on processing equipment that executes the component programs, but interconnected via the network cloud 240. Occasionally, these computational resources, or nodes, can be subject to various classes of failures. Accordingly, developers of service applications, and the service models of the service applications built on such hosting environments (i.e., having distributed components), should recognize these classes of failures to implement protocols. The protocols typically provide some set of guarantees that the instances of the service application will be distributed across resources in the data center 200 and will not all concurrently fall offline during a particular class of failures. Accordingly, consistency in operation of the service application is preserved. As is discussed more fully below, fault domains are abstracted from the configuration of resources of the data center 200 in order to cope with these classes failures and to make assumptions with respect to the kind of failures expected and the conditions under which such failures can occur. Advantageously, developers of the service application may utilize this abstraction of the fault domains to describe requirements related to consistency and sustained availability of the service application. As discussed above, this description is typically included in the service model of the service application.

Returning to the configuration of the data center 200, each of the server 270, the computing device 280, the fault domains 251 and 252, and the racks A 205, B 210, and C 215 that have blades (e.g., blades A 260, blade B 261, blade C 262) operably coupled thereto can be any type of computing device, such as, for example, computing device 100 described above with reference to FIG. 1. By way of example only, and not limitation, each of server 270, the computing device 280, the fault domains 251 and 252, and the blades A 260, blade B 261, and blade C 262 can be a personal computer, a desktop computer, a laptop computer, a handheld device, a mobile handset, consumer electronic device, and the like. In embodiments, data center 200 may include any number of the physical resources listed above, and may include any collection of computing devices, or other machines capable of executing the service application. Additionally, one or more of the physical resources above can further include the fabric controller residing thereon to deploy, access, and manage the service application via wired or wireless network paths through the data center 200. It should be noted, however, that embodiments of the present invention are not limited to implementation on such physical resources illustrated in FIG. 2 but may be implemented on any of a variety of different types of computing devices and equipment within the scope of embodiments hereof. In other words, illustrated resources of the data center 200 depict an exemplary configuration only that is intended for discussion purposes only; accordingly, any suitable layout of resources known in the computing industry may be used and is contemplated by the present invention.

In particular, the exemplary resources of the data center 200 serve to introduce the concept of fault domains and update domains. As discussed above, fault domains represent a collection, or set, of nodes that become unavailable upon the occurrence of a particular class of failures within the data center. As discussed above, a node may reference a blade (e.g., blades A 260, blade B 261, and blade C 262), computer (e.g., computing device 280), machine (e.g., server 270), or any other device capable of running component programs, or instances, of the service application in the data center 200. Accordingly, the advantage of abstracting fault domains is to understand which groups of resources within the data center fall offline upon the an occurrence of a class of failures, and how other resources are partitioned from involvement in the failure.

Initially, abstracting fault domains may include selecting the class of failures that each represent a failure mode of hardware or software components that, upon occurrence, induces a respective set of nodes to cease functioning properly. This set of nodes is recognized and recorded as a fault domain for a particular failure mode of the class of failures. Many failure modes of equipment within a data center 200 are contemplated. For instance, the blades A 260, blade B 261, and blade C 262, which perform useful work when they are connected to the network cloud 240, become unavailable when the top rack switch 230 looses connectivity with the network 240. In embodiments, the top rack switch 230 is a device that connects racks (i.e., rack A 205 and rack B 210) containing blades to the network cloud 240. If the top rack switch 230 fails, the blades A 260, B 261, and C 262, even if continuing to operate properly, are no longer visible or available to the network cloud 240, and thus, constitutes a multi-blade failure. Accordingly, the blades of the rack A 205 and the rack B 210 (not shown), as well as any other resources linked to the network cloud 240 by the top rack switch 230 are abstracted as a fault domain 220 with respect to a particular class of failure. However, because the rack 215 is not connected to the network cloud 240 by the top rack switch 230, it is not considered as a node within the fault domain 220. In other words, the blades of the rack 215 are partitioned within the configuration of the data center 200 from the blades of the fault domain 220, and thus, would continue running instances of a service application upon a failure affecting the top rack switch 230.

In another instance, a class of failures may involve a mechanical fail of a power strip that carries power to the blades, the racks, the top rack switches, and other resources that require power. Upon failure of the power strip 235, many machines (or portions thereof) and racks (i.e., racks A 205, B 210, and C 215) that are traversed by the power strip 235 fall offline. Accordingly, due to the extensive influence of the power strip 235 in this example, this class of failures creates a fault domain 250 with a large number of nodes therein. The failure of the power strip 235 comprises a different failure mode than discussed above. In addition, this exemplary failure mode is hierarchical (i.e., failure of power strip 235 comprises failure of all the racks). Accordingly, the fault domain 250 includes the fault domain 220 and that of the rack C 215. In yet another class of failures, the fault modes may intersect. For example, the power strip 235 may cut across a section of various racks. Thus, its failure knocks down various subsets of blades from different racks.

Although various different configurations of the data center 200 and the fault domains 220, 250, 251, and 252 have been described, it should be understood and appreciated by those of ordinary skill in the art that other types of suitable fault domains that group a set of nodes, based on a class of failures, may be abstracted, and that embodiments of the present invention are not limited to those fault domains described herein. Further, the kinds, or classes, of failures which may occur in the data center 200, the resources affected, and the way such resources are affected, depend on the characteristics of the data center 200, and may vary based on the configuration thereof.

In embodiments, a hierarchy of classes of failures may be constructed. This hierarchy may be based on characteristics of the data center 200, such as the likelihood and scope of a failure mode within a class of failures. For instance, the hierarchy may be organized based on a frequency of occurrence of each of the classes of failures. Accordingly, the failures with the highest likelihood of occurrence are ranked highest in the hierarchy. In another instance, the hierarchy may be organized based on a scope of resources that become unavailable upon the occurrence of the classes of failures. Accordingly, the failures with the broadest scope are ranked highest in the hierarchy. These hierarchies may be utilized for identifying one or more of the classes of failures for abstraction to fault domains. By way of example, fault domains may be abstracted from the ten highest ranked classes of failures, while the lower ranked classes of failures are not considered as their effect on the data center 200 is slight and/or remote. Accordingly, the fault domains that have a real impact on a decision to partition instances of the service application when deployed throughout the data center 200 are captured and expressed in a failure model conveyed to the developer. As such, an exhaustive failure model that includes complex information not pertinent to the true nature of data center 200 resources is avoided. In an exemplary embodiment, a collection of hierarchies may be maintained, where each hierarchy represents a fault mode independent of the rest of the fault modes of the hierarchies.

Figure 3:
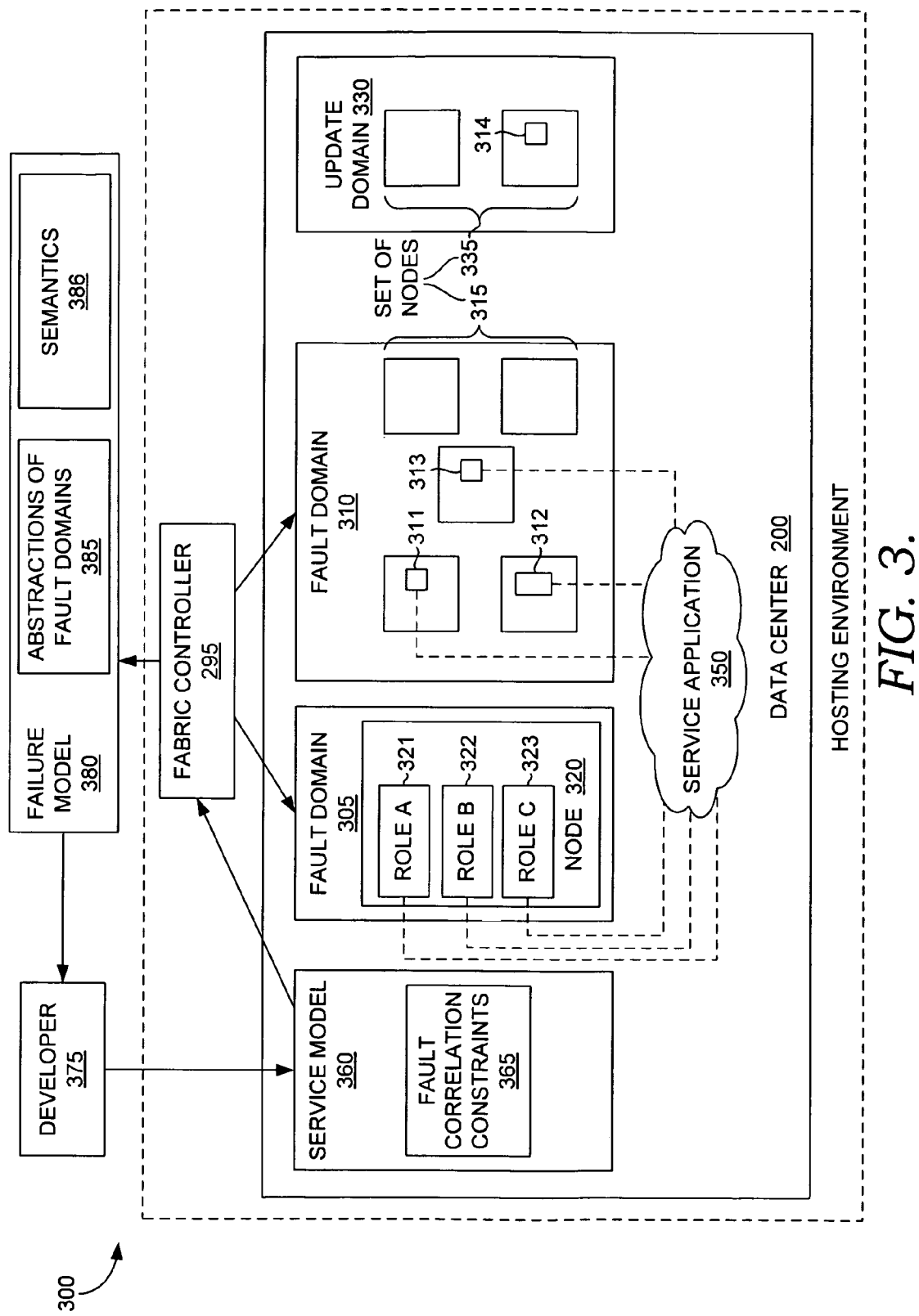
FIG. 3 is a graphical representation of an exemplary hosting environment, in accordance with an embodiment of the present invention.

Turning now to FIG. 3, a graphical representation of an exemplary hosting environment 300 is shown, in accordance with an embodiment of the present invention. In particular, the hosting environment 300 includes the fabric controller 295, a service application 350, the data center 200 for supporting the operation of the fabric controller 295 and the service application 350, and a service model 360 for instructing the fabric controller 295 on how to deploy and manage the service application 350. As discussed above, the data center includes resources that are organized into fault domains based on relevant failures that may occur at the hosting environment 300. In embodiments, the fault domains, such as fault domains 305, and 310 are abstracted 385 for conveyance to a developer 375 in the format of a failure model 380. In one embodiment, the fabric controller 295 is, at least in part, responsible for generating the abstraction of the fault domains 385. In another embodiment, a curator (not shown) of the hosting environment 300 is charged with generating the abstraction of the fault domains 385. In other embodiments, a third party, or the developer 375, may participate in generating the abstraction of the fault domains 385.

Irrespective of the entity generating the abstraction of the fault domains 385, the process of developing the failure model 380 of the data center 200 for delivery to the developer 375 of the service application 350 remains fairly consistent. Initially, the architecture of resources utilized by the data center 200 is inspected to ascertain classes, or modes, of failure of the data center 200, as discussed above. Upon inspection, a first set of nodes 315 may be enumerated within the data center 200 that concurrently become unavailable upon an occurrence of the ascertained failure mode. In this instance, the set of nodes 315 become concurrently unavailable upon the occurrence of a particular failure, and thus, are grouped as fault domain 310.

In addition, a second set of nodes 335 within the data center 200 are enumerated as an update domain 330. The update domain 330 is a set of nodes that are intentionally induced to become concurrently unavailable in accordance with an update scheme. By way of example, the updates are driven by requirements of the hosting environment 300 (e.g., updating a version of the operating system software) and may be induced by the curator thereof. In this instance, the set of nodes 335 become concurrently available upon the implementation of an update, and thus, are grouped as the update domain 330. Further, taking nodes offline happens independently of the classes of failures. As such, the abstractions of the fault domains 385 typically include a description of the update domain 330 that are identified in the data center 200 to provide assurances that a least one instance of each role of a service application 350 is actively running. In exemplary embodiments, the sets of nodes in update domain 330 and fault domain 310 can, and in many cases will intersect, although shown as distinct for illustrative purposes.

Upon identifying the fault domains 310 and 305, and the update domains 330, the abstractions of the fault domains 385 are provided to the developer 375 in the failure model 380. Further, fault correlation constraints 365 that direct the management and deployment of the instances of the service application 350 may be abstracted from the fault domains 310 and the updated domains 330. Accordingly, the fault correlation constraints 365 may be stored within the service model that is delivered by the developer 375 of the service application 350, which is executable upon being distributed throughout the architecture of resources of the data center 200 based on the fault correlation constraints 365.

Generally, the service model 360 is an interface blueprint that provides instructions for managing component programs, such as the instances 311, 312, 313, and 314, of the service application 350. The service model 360 acts to guide the fabric controller 295 in coordinating activities between the deployed component programs upon deployment to distributed locations throughout the data center 200. These locations are typically established within the confines of the fault correlation constraints 365 within a service model 360. In addition, the service model 360 includes specifications that identify such aspects of managing the service application 350 as which maps to employ during instantiation, which resources to utilize during propagation of component programs, which channels to utilize as communication paths between component programs, and any other information that describes the particular way service application 350 will be executed at the data center 200.

The service model 360 may include a deployment specification that manages the installation of the instances 311, 312, 313, and 314 of each of one or more roles 321, 322, and 323, thereby distributing component programs of the service application 350 throughout the data center 200. In an exemplary embodiment, the deployment specification indicates a minimum number of the fault domains 310 and update domains 330, associated with each of the failure modes, to allocate for instances 311, 312, 313, and 314 of each of the roles 321, 322, and 323 of the service application 350. In examples, each of the allocated minimum number of fault domains 310 and update domains 330 is assigned to a particular component program for placement of the instances 311, 312, 313, and 314 of the roles 321, 322, and 323 thereon.

In one instance, the process of deployment involves recursively selecting the fault domains 310 and the update domains 330 of the data center 200 for placement of instance thereon until the deployment specification (e.g., fault correlation constraints 365) of the service model 360 is satisfied. In this embodiment, the deployment process may involve selecting two of the fault domains 305 and 310 for installing the instances 311 and 321 of the role A, two of the fault domains 305 and 310 for installing the instances 312 and 322 of the role B, and two of the fault domains 305 and 310, and the update domain 330, for installing the instances 323, 313, and 314, respectively of the role C of the service application 350. These installations may place the instances 321, 322, 323, 311, 312, 313, and 314 on a common node 320 of the fault domain 305, or on separate nodes of the set of nodes 315 that comprise the fault domain 310. In the latter configuration of the deployment service, the distribution of the instances 311, 312, and 313 on separate nodes builds in an extra level of resilience to failures, as each node may be considered an individual fault domain based on the class of failures utilized for making the determination of the fault domains.

The deployment process continues in selecting one or more of the update domains 330 for installing the instances 321, 322, 323, 311, 312, 313, and 314 of the roles A, B, and C. Typically, the selected update domains 330 comprise the set of nodes 335. These steps of placing instances of nodes of the service application 350 may be repeated until the fault correlation constraints 365 are satisfied. By way of example, a particular embodiment of the deploy specification may include the following steps, in no particular order: recursively selecting the fault domains 305 and 310 and the update domains 330 of the data center 220 that satisfy the fault correlation constraints 365 of the service model 360; installing the instances 321, 322, 323, 311, 312, 313, and 314 of the service application 350 at the selected fault domains 305 and 310 and the selected update domains 330; and deriving from the service model 360 configuration settings for administration to the installed instances. As discussed above, the nodes of the selected domains typically do not share underlying resources. Accordingly, the instances are partitioned via the configuration of the data center 200 such that failures, or updates to, certain nodes, will not pull each of the installed instances of the service application 350 offline.

Semantics 386 may also be constructed from the configuration of resources at the data center 200. Similar abstraction of the fault domains 385, the semantics 386 influence the distribution of the service application 350 throughout the data center 220 and may be expressed to the developer 375 within the failure model. But, the semantics 386 serve to generally define a maximum aggregate number of fault domains and update domains that are allowed to be concurrently nonfunctional at any given time. Accordingly, the semantics 386 provide assurances to the developer 375 that, when executing the distributed service application 350 of the hosting environment 300, only a certain number will be offline due to failures or updates at a time.

In embodiments, the instructions of the service model 360 are derived from the fault correlation constraints 365 and the semantics 386. In a particular example of this embodiment, the service model 360 is read to determine which roles (e.g., roles A 321, B 322, and C 323) of the service application 350 to construct, and how many instances of each of the roles to place within the data center 200. As discussed above, each of the instances is a replication of the particular class of component, or role. The number of the instances may be based on a total number of fault domains 305 and 310 per failure mode of the data center, plus the update domain(s) 330. Once a total number is calculated, the instances of the particular class of components are partitioned at separate fault domains and update domains in accordance with the instructions of the service model 360. Accordingly, instances are located a different sets of nodes (e.g., nodes 315, 320, and 335) in different domains (e.g., domains 305, 310, and 330) such that a failure or deactivation of a node impacts the availability of only one instance of a particular role. Thus, resilience is built into the distribution of the service application 350 across the resources of the data center 200.

By way of example only, for a particular service application 350 there exists a role A that is replicated three times to generate three instances 321, 311, and 314 of the role. The number of instances may be determined from the fault correlation constraints 365 that rely on the abstractions of the fault domains 385 and the semantics 386. In this example, the abstractions of the fault domains 385 indicate that two fault domains 305 and 310 are partitioned during a particular failure mode. Further, the semantics 386 may indicate that only one of the two fault domains 305 and 310 is allowed to fall offline at a time, while the update scheme will only allow one update domain 330 to be intentionally deactivated at a time. Thus, based on these constraints, three is the minimum number of instances to place on the data center 200 during instantiation that ensures a role is available to the service application 350 upon the concurrent failure of a fault domain and deactivation of an update domain that each underlie an instance of the role.

During the process of instantiation, the deployment specification may be responsible for properly distributing the instances accordingly to the fault correlation constraints in order to achieve the desired partitioning to ensure resilience upon the failure or deactivation of a node. That is, the deployment specification influences the instantiation process and manages the placement of the instances of roles within the data center 200. In one instance, as discussed above, the deployment specification may identify a minimum number of the fault domains and update domains, per the failure modes and update schemes, respectively, for placement of the role instances. In a particular instance, identifying a minimum number of the fault domains and update domains is carried out by correlating nodes to each of the abstracted fault domains and update domains, and utilizing the correlations to install the instances of each of the roles at the appropriate nodes to eliminate installing instances on separate nodes within a same update domain or a same fault domain. Next, the deployment specification may allocate nodes within the identified domains for supporting the operation of the role instances. In addition, the deployment specification may install the instances on the allocated nodes such that each of the instances are isolated from a failure of a node supporting another instance.

Installing may include defining channels within the hosting environment 300 that are to be utilized as communication paths between the installed instances of differing roles or of instances of the same role. These channels may be either established in the hosting environment 300 upon instantiation, or may be preexisting and expressed to the fabric controller 295 to enable communication between the expansively placed instances. In addition, the process of installing may include administering parameters to the configuration settings of the placed instances. This configuration of the instances may provide the instances with information related to the allocated fault domain and/or update domain on which the instances are placed, or information related to the communication paths, and APIs, that connect the instances to other instances and resources. The communication between the instances is more fully discussed with reference to FIG. 5.

Figure 4:
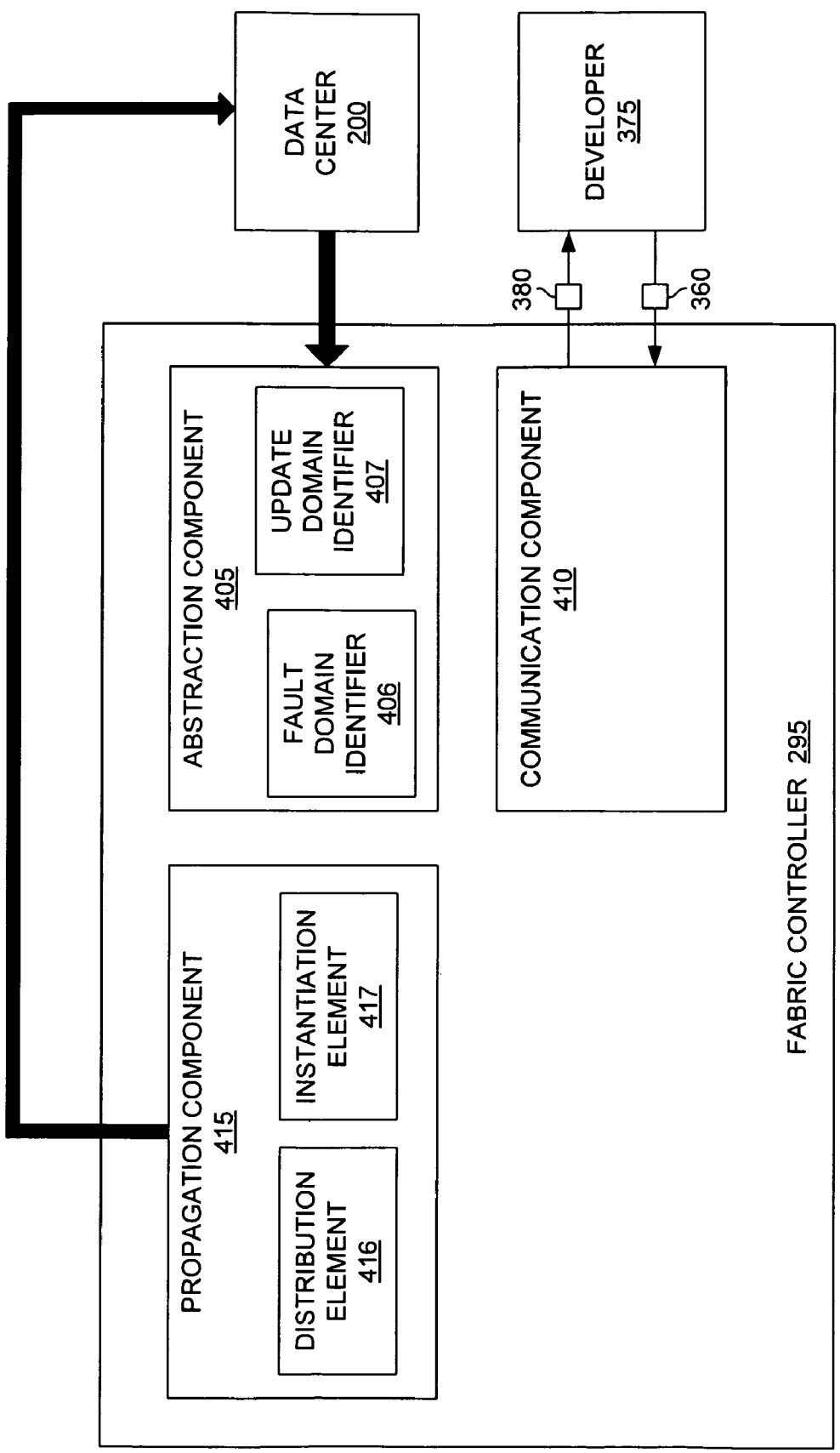
FIG. 4 is a block diagram of an exemplary fabric controller for establishing fault correlation constraints and deploying instances based thereupon, in accordance with an embodiment of the present invention.

With reference to FIG. 4, a block diagram is illustrated that shows an exemplary fabric controller 295 for establishing fault correlation constraints and deploying instances based thereupon, in accordance with an embodiment of the present invention. Initially, the fabric controller 295 runs on top of a processing unit coupled to a computer storage medium. This computer storage medium may have a plurality of computer software components stored thereon that are executable by the processing unit. These computer software components represent a part of the functionality of the fabric controller 295 and may include, at least, an abstraction component 405, a communication component 410, and a propagation component 415.

In embodiments, the abstraction component 405 may include a fault domain identifier 406 and an update domain identifier 407. The fault domain identifier 406 may serve to abstract the fault domains within the data center 200 by grouping together sets of nodes that concurrently become unavailable upon an occurrence of a mode of failure of the resources, while the update domain identifier 407 may serve to abstract the update domains within the data center 200 by grouping together sets of nodes that concurrently become unavailable upon an intentional deactivation of the resources of the data center 200 according to an update scheme. The update scheme may indicate the timing and the extent of which nodes to pull down for updating. In instances, updating may include installing new or revised software (e.g., operating system), establishing channels that traverse the nodes to facilitate communication pathways of instances, and physically updating equipment of the data center 200, such as replacing a power strip or switching out a faulty blade.

In other embodiments, the abstraction component 405 is capable of identifying various classes of failures of the data center that cause sets of nodes to concurrently become unavailable. Upon identifying these various classes of failures, the abstraction component 405 may construct a hierarchy of the classes of failures based on characteristics of the hosting environment and/or the data center. By way of example, the hierarchy may be organized based on a frequency of occurrence of each of the classes of failures. In another example, the hierarchy may be organized according to a significance of each of the failures. In one instance, a determining a significance of the failures may be demonstrated as determining whether a class of failure will completely pull an instance offline, or whether the instance is allowed to operate with partial functionality, thus, remaining online and available to other instances of the service application. In application, the hierarchy may be employed to select one or more of the classes of failures with a high frequency of occurrence, significance, or another property to be used for identifying fault domains.

The communication component 410 may be configured to communicate the abstracted fault domains and update domains, as well as semantics of the hosting environment to the developer 375. This communication may be formatted as failure model 380. The information in the failure model 380 influences a distribution of the service application throughout the hosting environment. In particular, the semantics define a maximum aggregate number of fault domains and update domains that are allowed to be concurrently nonfunctional while the distributed service application is being executed on top of the data center. In accordance with decisions of the developer 375 of the service application, based on consideration of the failure model 380, the service model 360 is constructed and conveyed to the fabric controller 295. The communication component 410 interprets the fault correlation constraints upon receipt of the service model 360. As discussed above, the fault correlation constraints provide instructions for allocating nodes, each within a separate set of nodes encompassed by a partitioned fault domain and/or update domain. Each of the allocated nodes is configured for accommodating the operation of instances of a role of the service application.

The propagation component 415, in embodiments, is capable of performing the allocation of the appropriate nodes to satisfy the fault correlation constraints and to place the role instances thereon. Initially, the propagation component 415 includes a distribution element 416 and an instantiation element 417. The distribution element 416 satisfies the instructions of the service model by installing the instances on the allocated nodes and administering parameters to configure the installed instances. In one instance, the parameters include a map that directs each of the installed instances to a location of other installed instances within the hosting environment. Generally, the allocated nodes are based on the fault correlation constraints, which may be a reflection of a decision made by the developer 375. For instance, the developer 375 may decide to install instances of each of the roles that comprise the service application on nodes partitioned between X number of fault domains. Further, the developer 375 may specify Y number of update domains at which to place instances of the roles. Thus, the fault correlation constraints relay these instructions to the propagation component 415, which carries out the instructions by allocating nodes on the appropriate domains. However, curators of the data center 200, at their discretion, may select additional domains for placement of instances to build in a degree of safety.

The instantiation element 417 is configured to carry out the installation of the instances on the allocated nodes and to set up the instances to operate in coordination with each other. Accordingly, the instantiation process facilitates managing the service application. In one instance, the instantiation process includes, at least, the following logical steps: establishing component programs, or instances, at the allocated nodes; deriving formalized values based on a variety of factors (e.g., properties of the allocated nodes); automatically propagating the formalized values to the instances; and installing the formalized values thereon. In embodiments, the component programs are established by deploying (e.g., generating new component programs), or identifying as available, existing component programs on nodes within the data center. In an exemplary embodiment of identifying available existing component programs, configuration settings within the existing component programs are interrogated to determine whether they are compatible with the design of the role for which they will embody.

This exemplary fabric controller 295 is but one example of a suitable software construct that may be implemented to carry out aspects of the present invention, and is not intended to suggest any limitation as to the scope of use or functionality of the invention. Neither should the illustrated exemplary fabric controller 295 be interpreted as having any dependency or requirement relating to any one or combination of the software components 405, 410, and 415 as illustrated. In some embodiments, one or more of the components 405, 410, and 415 may be implemented as stand-alone devices. In other embodiments, one or more of the components 405, 410, and 415 may be integrated directly into node(s) of the data center 200 or the installed instance itself. It will be understood by those of ordinary skill in the art that the components 405, 410, and 415 illustrated in FIG. 4 are exemplary in nature and in number and should not be construed as limiting.

Accordingly, any number of components may be employed to achieve the desired functionality within the scope of embodiments of the present invention. Although the various components of FIG. 4 are shown with lines for the sake of clarity, in reality, delineating various components is not so clear, and metaphorically, the lines would more accurately be grey or fuzzy. Further, although some components of FIG. 4 are depicted as single blocks, the depictions are exemplary in nature and in number and are not to be construed as limiting (e.g., although only one communication component 410 is shown, many more may be communicatively coupled to various other developers or other entities that influence the configuration of the fault correlation constraints).

Figure 5:
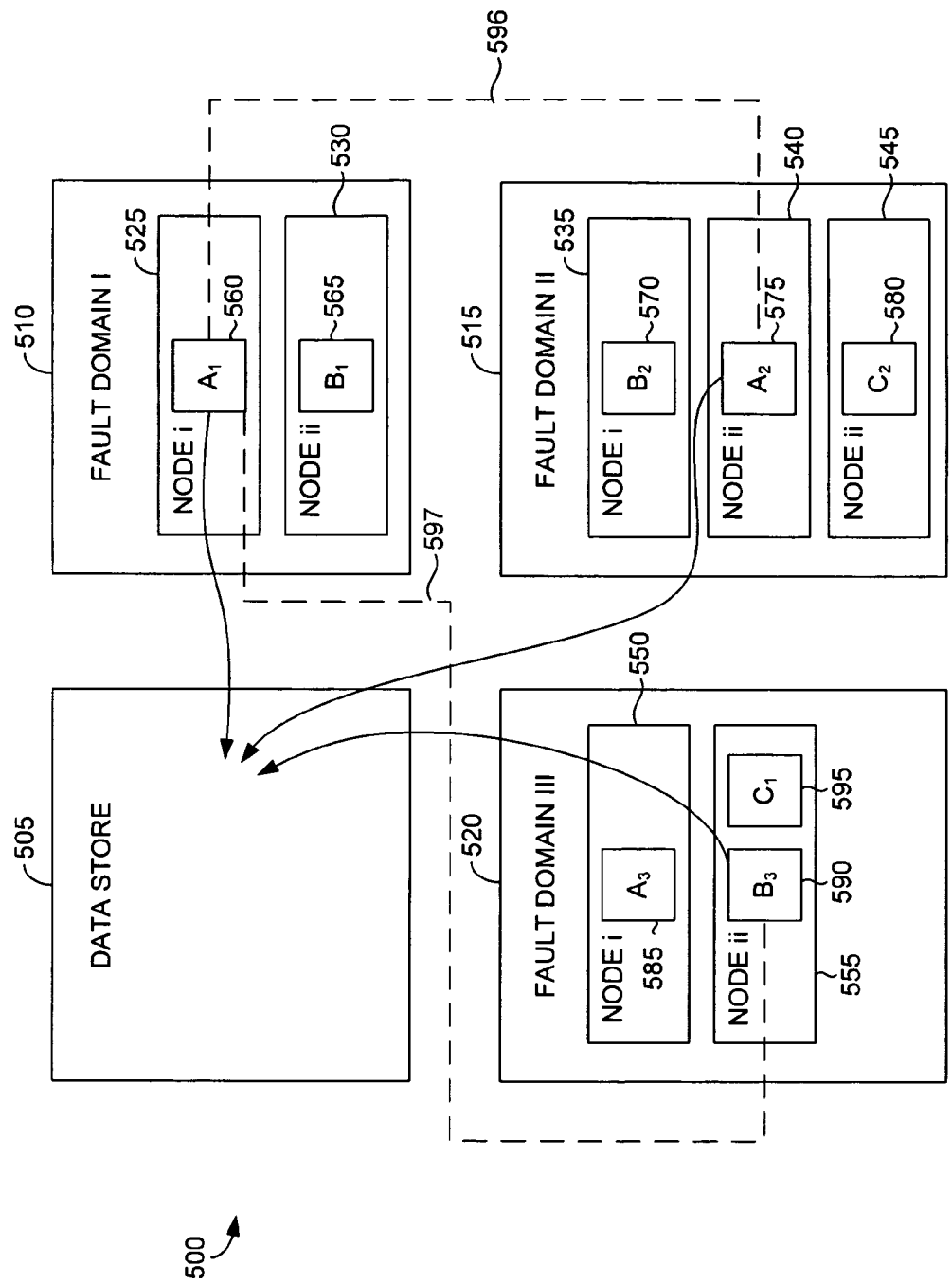
FIG. 5 is a graphical representation of an exemplary topology of a data center with instances instantiated on nodes based on fault correlation constraints, in accordance with an embodiment of the present invention.

Turning now to FIG. 5, a graphical representation of an exemplary topology 500 of a data center (e.g., data center 200 of FIGS. 2-4) with instances instantiated on nodes based on fault correlation constraints, in accordance with an embodiment of the present invention.

Initially, the topology 500 of the data center includes fault domains I 510, II 520, and III 530 that fail in isolation upon the event of a failure mode. As discussed above, the fault domains I 510, II 520, and III 530 will be identified, typically, if the failure mode is ranked highly within the hierarchy of classes of failures. Each of the fault domains I 510, II 520, and III 530 encompasses a set of nodes, thereby indicating to the fabric controller which nodes are partitioned from other nodes. The partitioning of the nodes is generally based, in part, on an architecture of the resources of the data center. As illustrated, the fault domain I 510 encompasses node i 525 that has an instance 560 of role A installed thereon, and node ii 530 that has an instance 565 of role B installed thereon. The fault domain II 515 encompasses node i 535 that has an instance 570 of role B installed thereon, node ii 540 that has an instance 575 of role A installed thereon, and node iii 545 that has an instance 580 of role C installed thereon. The fault domain III 520 encompasses node i 550 that has an instance 585 of role A installed thereon, node ii 555 that has an instance 590 of role B and an instance 595 of role C installed thereon.

The instances 560, 565, 570, 575, 580, 585, 590, and 595 of roles A, B, and C are placed on the nodes 550, 555, 560, 565, 570, 575, and 580 based on parameters within a deployment specification that are used by the fabric controller during instantiation. As discussed above, the parameters of the deployment specification are based on the fault correlation constraints received from an entity responsible for designing the service application, such as the developer. The process of instantiation is guided by the deployment specification to distribute parameters to preexisting components on the nodes to establish a functioning instance of a role, or to establish a new component program configured as a role instance. Generally, a part of the fabric controller may be located on each node, which is referred to herein as an agent. The "agent" is charged with initiating the role by installing the parameters therein. These parameters may be based on the properties of the nodes, on the locations of other instances of the service application within the topology 200 of the data center, and the like. Accordingly, the parameters allow for communication between instances of the roles. For instance, the parameters installed in the instance 560 of role A will direct the instance 560 to communicate with another instance 575 of role A via a channel 596 of the data center. In another instance, the parameters installed in the instance 560 of role A will direct the instance 560 to communicate with an instance 590 of another type of role, role C, via a channel 597 of the data center. Accordingly, the instances 560, 575, and 590 on differing fault domains I 510, II 515, and III 520, respectively, will be allowed to interact despite their separation on differing physical resources.

Maps may be utilized to facilitate this interaction. Upon deployment, maps may be generated to provide access to allocations made by the fabric controller with respect to the fault correlation constraint. Essentially, the maps facilitate talking between the instances 560, 565, 570, 575, 580, 585, 590, and 595 of roles A, B, and C by recording and making accessible the location of the instances 560, 565, 570, 575, 580, 585, 590, and 595 once deployed. Maps may be generated from information provided to a data store 505 on the data center topology 200 based on the deployment of the instances 560, 565, 570, 575, 580, 585, 590, and 595. In other embodiments, a map may be created based on the fault correlation constraints. Although two different configurations of maps have been described, it should be understood and appreciated by those of ordinary skill in the art that other types of suitable process and data for generating maps may be used, and that embodiments of the present invention are not limited to those map configurations described herein.

In one embodiment, the maps are centrally located (e.g., the data store 505) and are accessible by the fabric controller, or any other component that is querying the location of a role instance. In another embodiment, portions of the maps are stored within the instances 560, 565, 570, 575, 580, 585, 590, and 595 by teaching the instances upon instantiation. Teaching the instances 560, 565, 570, 575, 580, 585, 590, and 595 of the one or more roles to communicate therebetween across the assigned fault domains I 510, II 515, and III 520 and the assigned update domains (not shown) may involve various logical steps. These steps may include incorporating the map in the configuration settings of the placed instances via parameters installed thereto, automatically propagating the parameters to each of the placed instances, and teaching each of the placed instances a location within the data center of other placed instances that support the service application by administering the parameters to the configuration settings of the placed instances. In effect, the maps encourage communicating between fault domains I 510, II 515, and III 520 (e.g., via channels 596 and 597). This communication is inherently protective of information and allows for persisting data so that information is not lost or corrupted if an instance becomes unavailable due to an underlying node falling offline.

Further, the communication between the role instances 560, 565, 570, 575, 580, 585, 590, and 595 can be relied on by the application writer (i.e., developer) and/or the application deployer (e.g., curator) to guarantee a certain level of resilience when confronted with failures. In addition, APIs (not shown) provide the developer or curator with feedback of the deployment of the service application. In one embodiment, the feedback may take the form of a location, node, fault domain, or update domain on which a particular role instance of the service application is placed. Accordingly, the APIs allow the curator/developer to query the system to determine which roles were placed on which fault domains. This response to this query helps to decide where to place the data stores (e.g., data store 505) for temporarily recording configuration settings and state data of the instances 560, 565, 570, 575, 580, 585, 590, and 595. Further, the APIs of the data center, in conjunction with the map, can be used by the service application itself to find the fault domains and upgrade domains underlying each one of the role instances 560, 565, 570, 575, 580, 585, 590, and 595. This knowledge can be used by the service application to make placement decisions of its data, and to guarantee a certain degree of availability in the face of failures or upgrades.

Referring now to FIG. 6, a flow diagram that shows an overall method 600 for placing instances of a service application according to a service model is illustrated, in accordance with an embodiment of the present invention. Generally, the method 600 facilitates persistent availability of a service application by expressing one or more fault correlation constraints to a developer of the service application. Initially, the method 600 includes, identifying fault domains within a hosting environment, as depicted at block 605. Typically, the fault domains each represent a set of nodes that each concurrently become unavailable upon an occurrence of a particular class of failures within the hosting environment. As depicted at block 610, one or more fault correlation constraints are expressed to the developer of the service application. Typically, the fault correlation constraints include an abstraction of the identified fault domains. As depicted at block 615, a service model is received from the developer. Generally, the service model provides instructions for allocating one of the set of nodes within one or more of the fault domains within the hosting environment to execute at least one role of the service application. As discussed above, the role refers to a component program that supports the functionality of the service application. As depicted at block 620, based on the instruction of the service model, an instantiation process is initiated that places the instances of the role on the allocated set of nodes.

Referring now to FIG. 7, a flow diagram is shown that illustrates an overall method 700 for developing a failure model of a data center for delivery to a developer of a service application, in accordance with an embodiment of the present invention. Initially the method 700 includes a logical step of identifying fault correlation constraints of a data center, as depicted at block 705. In embodiments, the logical step of identifying fault correlation constraints of a data center includes, in no particular order, inspecting an architecture of resources utilized by a data center to ascertain modes of failure of the data center (see block 710), enumerating a first set of nodes within the data center that concurrently become unavailable upon an occurrence of the ascertained failure mode (see block 715), enumerating a second set of nodes within the data center that are intentionally induced to become concurrently unavailable in accordance with an update scheme (see block 720), and abstracting the fault correlation constraints from the first set of nodes and the second set of nodes (see block 725). The method may continue with, at least temporarily, storing the fault correlation constraints within a failure model that is deliverable to the developer of the service application, as depicted at block 730. The service application is typically executable upon being distributed throughout the architecture of resources of the data center.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, performs a method for facilitating persistent availability of a service application by expressing one or more fault correlation constraints to a developer of the service application, the method comprising:
   identifying fault domains within a hosting environment, wherein the fault domains each represent a set of nodes that each concurrently become unavailable upon an occurrence of a particular class of failures within the hosting environment;
   expressing to the developer of the service application one or more fault correlation constraints wherein, the one or more correlation constraints include an abstraction of the identified fault domains;
   receiving from the developer a service model that provides instructions for allocating one of the set of nodes within one or more of the fault domains within the hosting environment to execute at least one role of the service application, wherein the at least one role comprises a component program that supports the functionality of the service application; and
   in accordance with the instructions of the service model, performing an instantiation process, wherein the instantiation process comprises placing the one or more instances of the at least one role on the allocated one of the set of nodes.

2. The computer-readable media of claim 1, further comprising selecting the class of failures that each represent a failure mode of hardware or software components that, upon occurrence, induces a respective set of nodes to cease functioning properly.

3. The computer-readable media of claim 2, wherein selecting comprises:
   constructing a hierarchy of classes of failures based on characteristics of the hosting environment, wherein the hierarchy is organized based on a frequency of occurrence of each of the classes of failures; and
   utilizing the hierarchy for selecting one or more of the classes of failures for derivation of the fault domains.

4. The computer-readable media of claim 1, wherein the instructions of the service model comprise a specification for deployment that influences the instantiation process that places the one or more instances of the at least one role of the service application within the hosting environment.

5. The computer-readable media of claim 4, wherein the specification for deployment delimits a minimum number of the fault domains, per failure mode, to allocate to execute the one or more instances of the at least one role.

6. The computer-readable media of claim 5, wherein the specification for deployment defines which channels, established within the hosting environment, are utilized as communication paths between the placed one or more instances of differing roles once instantiated on the appropriate fault domains.

7. The computer-readable media of claim 1, wherein the instructions of the service model further comprise configuration settings to administer to the one or more instances during the instantiation process, wherein the configuration settings include information related to the allocated one or more of the fault domains on which the one or more instances are placed.

8. The computer-readable media of claim 1, wherein each of the set of nodes represents a computing device capable of running the one or more instances of the service application within the hosting environment.

9. A computerized method for developing a failure model of a data center for delivery to a developer of a service application, the method comprising:
   employing a processor to identify fault correlation constraints of a data center, wherein identifying comprises:
   (a) inspecting an architecture of resources utilized by a data center to ascertain modes of failure of the data center;
   (b) enumerating at least a first set of nodes within the data center that concurrently become unavailable upon an occurrence of the ascertained failure mode;
   (c) enumerating at least a second set of nodes within the data center that are intentionally induced to become concurrently unavailable in accordance with an update scheme; and
   (d) abstracting the fault correlation constraints from at least one the first set of nodes and the second set of nodes; and
   at least temporarily storing the fault correlation constraints within a failure model, wherein the failure model is stored by the processor on computer-storage medium accessible to the developer of the service application, wherein the service application is executable upon being distributed throughout the architecture of resources of the data center.

10. The computerized method of claim 9, the method further comprising:
   expressing, within the failure model, the enumerated first set of nodes as a fault domain and the enumerated second set of nodes as an update domain;
   constructing semantics that influence the distribution of the service application throughout the data center and define a maximum aggregate number of fault domains and update domains that are allowed to be concurrently non-functional when executing the distributed service application; and at least temporarily storing the semantics within the failure model.

11. The computerized method of claim 10, the method further comprising:
   attaining a service model upon delivering the failure model to the developer of the service application, wherein instructions of the service model are derived from the fault correlation constraints and the semantics;
   reading the service model to determine one or more roles that each represent a particular class of component of the service application; and
   reading the service model to determine how many instances of each of the one or more roles to place within the data center,
   wherein each of the instances is a replication of the particular class of component, and
   wherein each of the instances of the particular class of components is partitioned at separate fault domains and update domains in accordance with the instructions of the service model.

12. The computerized method of claim 11, the method further comprising initiating an instantiation process for deploying the instances of the one or more roles of the service application in accordance with the service model, the instantiation process comprising:
   recursively selecting the fault domains and the update domains of the data center that satisfy the service model;
   installing the instances of the service application at the selected fault domains and the selected update domains; and
   deriving from the service model configuration settings for administration to the installed instances.

13. The computerized method of claim 12, wherein the service model includes a deployment specification that manages the installation of the instances of each of the one or more roles, thereby distributing component programs of the service application, which support the functionality thereof, throughout the data center, wherein the deployment specification indicates a minimum number of the fault domains, associated with each of the failure modes, to assign to each of the one or more roles of the service application for placement of the instances of the one or more roles thereon.

14. The computerized method of claim 13, wherein the deployment specification indicates a minimum number of the update domains to assign to each of the one or more roles of the service application for placement of the instances of the one or more roles thereon.

15. The computerized method of claim 14, the method further comprising:
   correlating each of the enumerated first set of nodes to one of the fault domains and correlating each of the enumerated second set of nodes to one of the update domains; and
   utilizing the correlations to install the instances of each of the one or more roles at the appropriate first and second set of nodes in accordance with the deployment specification.

16. The computerized method of claim 15, the method further comprising mapping which of the fault domains and which of the update domains is assigned to each of the installed instances of each of the one or more roles.

17. The computerized method of claim 16, the method further comprising teaching the instances of the one or more roles to communicate therebetween across the assigned fault domains and the assigned update domains, wherein teaching comprises:
   incorporating the mapping in the configuration settings;
   automatically propagating the configuration settings to each of the installed instances; and
   teaching each of the installed instances a location within the data center of other installed instances that support the service application by administering the configuration settings to the installed instances of the one or more roles.

18. The computerized method of claim 12, wherein recursively selecting the fault domains and the update domains of the data center that satisfy the service model comprises:
   selecting one or more of the fault domains for installing the instances of a first role, of the one or more roles, of the service application, wherein the selected one or more fault domains comprises the first set of nodes;
   selecting one or more of the update domains for installing the instances of the first role, wherein the selected one or more update domains comprises the second set of nodes; and
   selecting a node of a third set of nodes for installation of one of the instances of the first role, wherein the node of the third set of nodes is supported by resources, utilized by a data center, that are uncommon to the resources underlying the first set of nodes and the second set of nodes.

19. A computer system for performing a method that abstracts fault domains from resources of a data center, the computer system comprising a processing unit coupled to a computer-storage medium, the computer storage medium having stored thereon a plurality of computer software components executable by the processing unit, the computer software components comprising:
   an abstraction component embodied on the computer-storage medium to abstract the fault domains within the data center by grouping together sets of nodes that concurrently become unavailable upon an occurrence of a mode of failure of the resources;
   a communication component embodied on the computer-storage medium to communicate the abstracted fault domains and semantics, which influence distribution of a service application throughout the data center, as fault correlation constraints, wherein the semantics define a maximum aggregate number of fault domains and update domains that are allowed to be concurrently non-functional when executing the distributed service application, and to receive a service model that is based, in part, on the fault correlation constraints and that provides instructions for allocating nodes, within the sets of nodes encompassed by the fault domains, for accommodating instances of a role of the service application,
   wherein the role comprises a component program that supports the functionality of the service application,
   wherein each of the instances includes a single replication of the role, and
   wherein the fault domains provide a platform for executing the instances of the role; and
   a propagation component embodied on the computer-storage medium that satisfies the instructions of the service model by installing the instances on the allocated nodes and administering parameters to configure the installed instances, wherein the configuring includes directing each of the installed instances to a location of other installed instances within the data center.

20. The computer system of claim 19, wherein the abstraction component is further configured for identifying various classes of failures of the data center that cause sets of nodes to concurrently become unavailable, constructing a hierarchy of the classes of failures based on characteristics of the data center, wherein the hierarchy is organized based on a frequency of occurrence of each of the classes of failures, and utilizing the hierarchy to select one or more of the classes of failures with a high frequency of occurrence as the fault domains.

* * * * *